United States Patent
Zeng et al.

(10) Patent No.: US 12,395,828 B2
(45) Date of Patent: Aug. 19, 2025

(54) BLUETOOTH SCANNING CONTROL METHOD, MOBILE TERMINAL, AND STORAGE MEDIUM

(71) Applicant: SHENZHEN TCL DIGITAL TECHNOLOGY LTD., Shenzhen (CN)

(72) Inventors: Qingzhong Zeng, Shenzhen (CN); Li Yan, Shenzhen (CN)

(73) Assignee: SHENZHEN TCL DIGITAL TECHNOLOGY LTD., Guangdong (CN)

( * ) Notice: Subject to any disclaimer, the term of this patent is extended or adjusted under 35 U.S.C. 154(b) by 407 days.

(21) Appl. No.: 17/999,861

(22) PCT Filed: Dec. 29, 2020

(86) PCT No.: PCT/CN2020/140496
§ 371 (c)(1),
(2) Date: Nov. 24, 2022

(87) PCT Pub. No.: WO2021/238196
PCT Pub. Date: Dec. 2, 2021

(65) Prior Publication Data
US 2023/0217233 A1 Jul. 6, 2023

(30) Foreign Application Priority Data
May 25, 2020 (CN) .......................... 202010449224.6

(51) Int. Cl.
*H04W 8/00* (2009.01)
(52) U.S. Cl.
CPC .................................. *H04W 8/005* (2013.01)
(58) Field of Classification Search
CPC .............................. H04W 8/005; H04W 8/00
See application file for complete search history.

(56) References Cited

U.S. PATENT DOCUMENTS

| 2007/0202808 A1 | 8/2007 | Kim | |
|---|---|---|---|
| 2016/0157083 A1* | 6/2016 | Reunamaki | H04W 8/005 |
| | | | 370/329 |
| 2018/0183596 A1* | 6/2018 | Deshpande | H04W 12/03 |

FOREIGN PATENT DOCUMENTS

| CN | 105450268 A | 3/2016 |
|---|---|---|
| CN | 106101990 A | 11/2016 |

(Continued)

OTHER PUBLICATIONS

European Search Report in European application No. 20937915.5, mailed on Jun. 14, 2024.

(Continued)

*Primary Examiner* — Tuan H Nguyen
(74) *Attorney, Agent, or Firm* — PV IP PC; Wei Te Chung

(57) ABSTRACT

The present disclosure relates to a BLUETOOTH scanning control method, a mobile terminal, and a storage medium. The method comprises: after receiving a BLUETOOTH scanning instruction, setting filter attribute information, wherein the filter attribute information is device attribute information of a BLUETOOTH device, which information is to be obtained by means of filtering in the present BLUETOOTH scanning operation; and acquiring the filter attribute information, performing BLUETOOTH scanning according to the filter attribute information, and displaying BLUETOOTH device information obtained by means of scanning. In the present embodiment, during BLUETOOTH scanning, a BLUETOOTH scanning operation is performed according to BLUETOOTH device information corresponding to the set filter attribute information, so as to obtain a BLUETOOTH device obtained by means of filtering and (Continued)

display the BLUETOOTH devices obtained by means of filtering, thereby reducing a scanning period, and achieving the aim of fast scanning.

12 Claims, 3 Drawing Sheets

(56) References Cited

FOREIGN PATENT DOCUMENTS

| | | |
|---|---|---|
| CN | 106210899 A | 12/2016 |
| CN | 106211030 A | 12/2016 |
| CN | 106211031 A | 12/2016 |
| CN | 107006049 A | 8/2017 |
| CN | 108271141 A | 7/2018 |
| CN | 108769967 A | 11/2018 |
| KR | 20080022296 A | 3/2008 |
| WO | 2015194854 A1 | 12/2015 |

OTHER PUBLICATIONS

1st Chinese Office Action issued in corresponding Chinese Patent Application No. 202010449224.6 dated Jan. 9, 2024, pp. 1-6.
2nd Chinese Office Action issued in corresponding Chinese Patent Application No. 202010449224.6 dated Apr. 27, 2024, pp. 1-5.
International Search Report in International application No. PCT/CN2020/140496, mailed on Mar. 25, 2021.
Written Opinion of the International Search Authority in International application No. PCT/CN2020/140496, mailed on Mar. 25, 2021.

* cited by examiner

FIG. 1 - PRIOR ART

BLUETOOTH SCANNING CONTROL METHOD, MOBILE TERMINAL, AND STORAGE MEDIUM

CROSS-REFERENCE TO RELATED APPLICATION

This application is a US national phase application based upon an International Application No. PCT/CN2020/140496, filed on Dec. 29, 2020, which claims priority to Chinese Patent Application No. 202010449224.6, entitled "BLUETOOTH SCANNING CONTROL METHOD, MOBILE TERMINAL, AND STORAGE MEDIUM", filed on May 25, 2020, the disclosure of which is incorporated herein by reference in its entirety.

FIELD OF THE DISCLOSURE

The present disclosure relates to a wireless connection technology, and more specifically, to a BLUETOOTH scanning control method, mobile terminal, and storage medium.

BACKGROUND

With development of Internet of Things era, various smart terminal devices have emerged. With the further opening of the Internet of Things, people are now increasingly demanding smart terminal devices, such as smart speakers, wristbands, and so on. These smart terminal devices are generally connected wirelessly, and in view of power consumption, these smart terminal devices are connected by using BLUETOOTH. If it is necessary to establish a connection with these smart terminal devices, first, these devices are required to be scanned, then make a binding connection, but in a scanning phase, following situations will be encountered: in a case that it is difficult to scan a device in places with great environmental interference, or in a case that it is difficult to scan a device when enabling the device after entering into a scanning interface, or in a case that many undesired devices will be scanned in places with many devices around so that a user may not identify a desired device at a glance. Therefore, a BLUETOOTH device is difficult to be scanned during a conventional BLUETOOTH connection process, and it often takes a long time to scan a device, or even cannot be scanned directly.

Therefore, the existing technology still needs to be improved and developed.

SUMMARY

In view of the above-mentioned deficiencies in the prior art, the purpose of the present disclosure is to provide a BLUETOOTH scanning control method, a mobile terminal and a storage medium, so as to solve following problems, for example, a BLUETOOTH device is difficult to be scanned during the existing BLUETOOTH connection process, or it takes a long time to scan a device, or even it cannot be scanned directly.

Technical solutions of the present disclosure are as follows:

In a first aspect, this embodiment provides a BLUETOOTH scan control method, comprising:
  receiving a BLUETOOTH scanning instruction and setting filter attribute information; wherein the filter attribute information is device attribute information of BLUETOOTH devices obtained by means of filtering in the present BLUETOOTH scanning operation;
  acquiring the filter attribute information, performing a BLUETOOTH scanning operation according to the filter attribute information, and displaying BLUETOOTH device information obtained by means of scanning.

Optionally, the device attribute information is device types of the BLUETOOTH devices; the step of setting the filter attribute information comprises:
  receiving setting information of the filter attribute information and configuring the device types of one or more BLUETOOTH devices to be filtered contained in the setting information as the filter attribute information.

Optionally, the step of performing a BLUETOOTH scanning operation according to the filter attribute information and displaying BLUETOOTH device information obtained by means of scanning comprises:
  filtering out unnamed BLUETOOTH devices whose device names are not obtained from scanned BLUETOOTH devices;
  filtering out the BLUETOOTH devices whose device types are same as the device types contained in the setting information in the unnamed BLUETOOTH devices to obtain filtered BLUETOOTH devices;
  sending a name request to the filtered BLUETOOTH devices, receiving a device name returned from the filtered BLUETOOTH devices, and displaying the device names of the BLUETOOTH devices received from the scanning process.

Optionally, the step of filtering the unnamed BLUETOOTH devices whose device names are not obtained from the scanned BLUETOOTH devices comprises:
  sending a BLUETOOTH scan request in response to the BLUETOOTH scanning instruction;
  receiving response information returned from each BLUETOOTH device for the BLUETOOTH scan request;
  determining whether the time for sending the BLUETOOTH scan request exceeds a preset time threshold;
  if exceeded, filtering the unnamed BLUETOOTH devices according to whether the response information contains a device name.

Optionally, the step of filtering the BLUETOOTH devices whose device types are same as the device types contained in the setting information from the unnamed BLUETOOTH devices comprises:
  creating a device queue consisting of each unnamed BLUETOOTH device obtained by means of filtering;
  determining whether the device queue is empty, if empty, stop the current BLUETOOTH scanning operation.

Optionally, the step of filtering the BLUETOOTH devices whose device types are same as the device types contained in the setting information from the unnamed BLUETOOTH devices comprises:
  creating a device queue consisting of each unnamed BLUETOOTH device obtained by means of filtering;
  determining whether the device queue is empty; if not empty, extract each unnamed BLUETOOTH device from the device queue in turn, and compare whether the device type is same as the device types contained in the setting information, respectively.

Optionally, before the step of comparing whether the device type is same as the device types contained in the setting information respectively, the method further comprises:
  creating a mapping table, the mapping table is a table of correspondence between setting name serial numbers and device types of the BLUETOOTH devices.

Optionally, the step of comparing whether the device type is same as the device types contained in the setting information respectively comprises:

parsing the received device information to parse out the setting name serial number contained in the device information;

searching the device type of the BLUETOOTH devices to be filtered from the preset mapping table according to the setting name serial number, wherein the mapping table is a correspondence table between the setting name serial numbers and the device types of the BLUETOOTH devices;

comparing the device type of the unnamed BLUETOOTH devices with each device type searched one by one and using the unnamed BLUETOOTH devices with same comparison result as the filtered BLUETOOTH devices.

Optionally, before the step of sending the name request to the filtered BLUETOOTH devices, the method further comprises:

determining whether the BLUETOOTH signal strength of each filtered BLUETOOTH device is greater than a preset signal threshold and sending a name request for the BLUETOOTH devices whose BLUETOOTH signals are greater than the preset signal threshold.

Optionally, after the step of performing a BLUETOOTH scanning operation according to the filter attribute information and displaying BLUETOOTH device information obtained by means of scanning, the method further comprises:

clearing the received setting information of the filter attribute information.

Optionally, the process of the BLUETOOTH scan request includes multiple BLUETOOTH scan cycles, and each BLUETOOTH scan cycle comprises two phases, Phase One is to scan for paired BLUETOOTH devices arounds itself and to receive the response information returned from the BLUETOOTH devices that have accepted the scan request; the Phase Two is the time to read the unnamed BLUETOOTH devices in the response scanned in Phase One.

Optionally, the duration of Phase One is a fixed scan time, when the scan time of Phase One is timed out, it is determined whether all received response information contain the device names of the BLUETOOTH devices, and if so, skip the BLUETOOTH devices.

Optionally, before the step of acquiring the filter attribute information and performing the BLUETOOTH scanning operation according to the filter attribute information, the method further includes:

defining the property of the device types of the BLUETOOTH devices.

In a second aspect, this embodiment provides a mobile terminal, comprising a memory and a processor, where the memory stores a computer program, wherein the processor implements the steps of the method when the computer program is executed.

In a third aspect, this embodiment provides a computer readable storage medium on which a computer program is stored, wherein the program, when executed, implements the steps of the method.

The BLUETOOTH scanning control method, mobile terminal and storage medium is provided by the present disclosure, the method comprises: receiving a BLUETOOTH scanning instruction, and setting filter attribute information; wherein, the filter attribute information is the device attribute information of the BLUETOOTH devices to be filtered in this BLUETOOTH scanning operation; acquiring the filter attribute information, performing a BLUETOOTH scanning operation according to the filter attribute information, and displaying BLUETOOTH device information obtained by means of scanning. In this embodiment, when the BLUETOOTH scanning is performed, the filter attribute information is set before the BLUETOOTH scanning is started, and the BLUETOOTH scanning is performed according to the set filter attribute information during the BLUETOOTH scanning, therefore reducing a scanning period, and achieving the aim of fast scanning.

BRIEF DESCRIPTION OF THE DRAWINGS

In order to illustrate the embodiments of the present disclosure or the technical solutions in the prior art clearly, appended drawings required in the descriptions of the embodiments and the prior arts are briefly described as follows. It should be apparent that the following drawings merely illustrate some embodiments of the present disclosure. For those skilled in the art, other drawings may be acquired according to the drawings without devoting effort.

DETAILED DESCRIPTION

Figure 1:
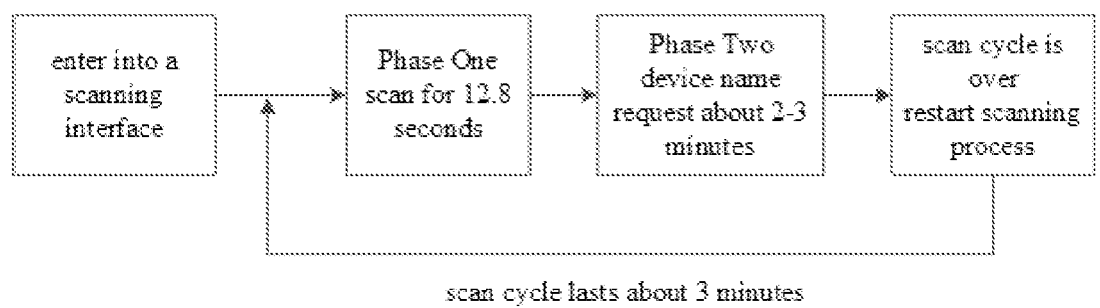
FIG. 1 is a schematic diagram of steps of a BLUETOOTH scanning control method in the prior art.

The present disclosure provides a BLUETOOTH scanning control method, a mobile terminal, and a storage medium. In order to make the objectives, technical solutions, and technical effects of the present disclosure clearer, the present disclosure will be further described in detail hereafter with reference to the accompanying drawings and examples. It should be understood that the specific embodiments described herein are simply used to explain the present disclosure, but not to limit the present disclosure.

In the embodiments and the scope of the patent application, unless the context has a special limitation on the articles, "a" and "the" may generally refer to a single or multiple.

In addition, if a description of "first", "second" and the like in the embodiments of the present disclosure is described, the description of the "first", "second" and the like is for the purpose of description only and is not to be construed as indicating or implying the relative importance or implicitly indicating the number of technical features indicated. Thus, a feature defining with "first", "second" may explicitly or implicitly include at least one of the features. In addition, the technical solutions between the various embodiments can be combined with each other but must be implemented based on one of ordinary skill in the art, and when the combination of the technical solutions is contradictory or cannot be realized, the combination of the technical solutions should not be considered to exist and are not within the protection scope claimed by the present disclosure.

The inventor found that a BLUETOOTH scanning technology in the prior art may be divided into two phases after turning on the BLUETOOTH scanning. Phase One is a BLUETOOTH module of a smart terminal device to be BLUETOOTH connected scans BLUETOOTH devices around the terminal device. This process lasts about 12.8 seconds. When the scan time expires, it will enter Phase Two. Phase Two is to read names of the BLUETOOTH devices scanned in Phase One. This process lasts about 2 to 3 minutes. Due to the long duration of the two phases, a user has to spend much time waiting for a scan result, and if there are many BLUETOOTH devices that may be matched in the environment, more BLUETOOTH devices will be scanned, and the user cannot identify a BLUETOOTH device to be connected from a scan list at a glance. The BLUETOOTH scanning technology in the prior art cannot meet the needs of users to quickly establish a BLUETOOTH connection.

In order to solve problems of long scan time and many BLUETOOTH devices scanned in the above-mentioned prior art, the present embodiment provides a BLUETOOTH scanning control method. By setting device types of BLUETOOTH devices required to be filtered in this BLUETOOTH scan operation, when performing a BLUETOOTH scanning operation, filtered BLUETOOTH devices are obtained according to the device types of the BLUETOOTH devices required to be filtered, and the filtered BLUETOOTH devices are displayed, thereby reducing a number of BLUETOOTH devices required for a name request in Phase Two, thereby reducing a time to send the name request and a time to receive a device name returned by the name request, and as the BLUETOOTH devices that do not need to be displayed are filtered, the displayed number of BLUETOOTH devices is reduced, it is more useful for the user to identify the desired BLUETOOTH device from the display list, which provides convenience for the user to quickly connect to the desired BLUETOOTH device.

Taking a smart television (TV) as an example, when a BLUETOOTH connection needs to be established between the smart television and a BLUETOOTH speaker, the BLUETOOTH function of the smart television needs to be enabled, and a BLUETOOTH scanning command is sent by clicking a button. When the smart television receives the BLUETOOTH scanning command, an interface for setting filter attribute information is enabled. The interface receives the filter attribute information input by a user, the filter attribute information may be a device type. The smart television reads the filter attribute information input by the user and filters the scanned BLUETOOTH devices according to the device type corresponding to the received filter attribute information to obtain the filtered BLUETOOTH devices and display the filtered BLUETOOTH devices. For example, if the device type is set to BLUETOOTH speakers, then when filtering the scanned BLUETOOTH devices, the device type of the BLUETOOTH devices obtained by means of filtering is BLUETOOTH speakers, and the BLUETOOTH devices that are filtered as BLUETOOTH speakers are displayed, so that the user may select a BLUETOOTH speaker that is required to establish a BLUETOOTH connection according to their needs.

It should be noted that the above application scenario is merely shown for convenience of understanding the present disclosure, and the embodiments of the present disclosure are not limited in this regard. Rather, the embodiments of the present disclosure may be applied to any applicable scenarios.

Figure 2:
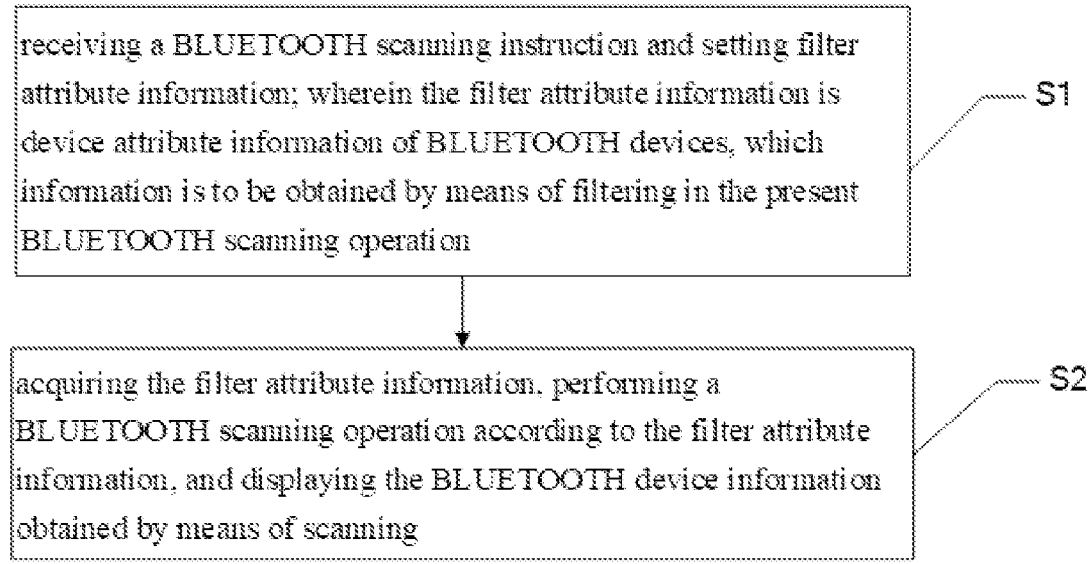
FIG. 2 is an exemplary flow chart of the BLUETOOTH scanning control method in an embodiment of the present disclosure.

This embodiment provides a BLUETOOTH scanning control method, as shown in FIG. 2, the method includes following steps:

Step S1: receiving a BLUETOOTH scanning instruction and setting filter attribute information; wherein the filter attribute information is device attribute information of BLUETOOTH devices, which information is to be obtained by means of filtering in the present BLUETOOTH scanning operation.

When a smart terminal device with BLUETOOTH function receives a BLUETOOTH scan command, the smart terminal device sets the filter attribute information for this BLUETOOTH scanning operation. The filter attribute information is the device attribute information of the BLUETOOTH devices to be filtered and obtained by the BLUETOOTH scanning operation. The device attribute information may be a device type or may be information such as a device name or a network address of the device.

In one embodiment, the device attribute information is the device types of the BLUETOOTH devices. Before the step of acquiring the filter attribute information, the method further comprises:

receiving setting information of the filter attribute information and configuring the device types of one or more BLUETOOTH devices to be filtered contained in the setting information as the filter attribute information.

After the BLUETOOTH scanning operation is started, the filter attribute information is set, thus the smart terminal device receives the setting information sent by the user to set the filter attribute information, the setting information includes the types of the BLUETOOTH devices to be filtered or is associated with the types of the BLUETOOTH devices to be filtered.

In this step, in order to facilitate the setting of attribute information to be filtered, a mapping table is created first, the mapping table is a correspondence table between setting name serial numbers and device types of the BLUETOOTH devices, and the setting information input may be setting name serial number, and the device type may be searched from the mapping table according to the setting name serial number.

Step S2: acquiring the filter attribute information, performing a BLUETOOTH scanning operation according to the filter attribute information, and displaying the BLUETOOTH device information obtained by means of scanning.

After the filter attribute information is set in the above step S1, the BLUETOOTH devices are scanned according to the filter attribute information set in the above step. A name request is merely implemented for the BLUETOOTH devices with the same device attribute information corresponding to the filter attribute information in the BLUETOOTH scanning process, therefore reducing name request time to achieve an aim of obtaining scan results quickly.

This step includes multiple BLUETOOTH scanning cycles, and following steps are performed in any BLUETOOTH scanning cycle:

Step S21: filtering out the unnamed BLUETOOTH devices whose device names are not obtained from the scanned BLUETOOTH devices.

After obtaining response information returned by each scanned BLUETOOTH device, it will analyze whether the response information returned from each scanned BLUETOOTH device contains the device name, and if not, determine the scanned BLUETOOTH device as an unnamed BLUETOOTH device.

The step of filtering the unnamed BLUETOOTH devices whose device names are not obtained from the scanned BLUETOOTH devices includes:

Step S211, sending a BLUETOOTH scan request in response to the BLUETOOTH scanning instruction; receiving response information returned from each scanned BLUETOOTH device for the BLUETOOTH scan request;

determining whether time for sending the BLUETOOTH scan request exceeds a preset time threshold;

if so, filtering the unnamed BLUETOOTH devices according to whether the response information contain a device name.

After each scanned BLUETOOTH device receives the BLUETOOTH scan request sent by the smart terminal device, it returns the response information to the smart terminal device, the response information contains information such as a name, a type, and a service of each scanned BLUETOOTH device.

When the BLUETOOTH device requesting a BLUETOOTH connection receives the BLUETOOTH scanning instruction, it first sets the filter attribute information, and when the setting of the filter attribute information is completed, it responds to the BLUETOOTH scanning instruction and sends the BLUETOOTH scan request. The process of the BLUETOOTH scan request includes multiple BLUETOOTH scan cycles, and each BLUETOOTH scan cycles includes two phases. Phase One is to scan paired BLUETOOTH devices around itself and to receive the response information returned by the BLUETOOTH devices that have accepted the scan request. The duration of Phase One is a fixed scan time, and the fixed time is the scan time corresponding to the BLUETOOTH specification. Phase Two is to read responses of unnamed BLUETOOTH devices scanned in Phase One, which generally takes 2 to 3 minutes.

When the scan time in Phase One is timed out, namely, the scan time exceeds the preset time threshold, the preset time threshold is the fixed scan time corresponding to the BLUETOOTH specification. In one implementation, the preset time threshold is 12.8 seconds. If the scan time of Phase One is timed out, that is, the scan time of Phase One exceeds 12.8 seconds, it is determined whether all received response information contain device names of the BLUETOOTH devices, and if so, skips the BLUETOOTH devices, and if not, go to next step.

Step S22: filtering out the BLUETOOTH devices whose device types are same as the device types contained in the setting information from the unnamed BLUETOOTH devices to obtain filtered BLUETOOTH devices.

When the BLUETOOTH devices that do not contain the device name in the response information is filtered in the above step S22, a device queue composed of each unnamed BLUETOOTH device obtained by means of filtering is created, and it is determined whether the device queue is empty, and if empty, stops the current BLUETOOTH scanning operation; if not empty, extracts each unnamed BLUETOOTH device from the device queue in turn, and compare whether the device type of the unnamed BLUETOOTH devices is same as the device types contained in the setting information respectively.

In this step, a device queue is first created for the filtered BLUETOOTH devices that do not contain device names, and according to each device name in the device queue, it is determined whether the device type is same as the device types set in the setting information. If so, obtain the BLUETOOTH devices to be filtered.

Further, the step of comparing whether the device type is same as the device types contained in the setting information respectively comprises:

parsing the received device information to parse out the setting name serial number contained in the device information;

searching the device type of the BLUETOOTH devices to be filtered from a preset mapping table according to the setting name serial number, wherein the mapping table is a correspondence table between the setting name serial numbers and the device types of the BLUETOOTH devices;

comparing the device type of the unnamed BLUETOOTH devices with each device type obtained by means of searching respectively and configuring the unnamed BLUETOOTH devices with a same comparison result as the filtered BLUETOOTH devices.

Since the device information may be one or more setting categories, and when the user inputs the device information, they may only input the device name serial number corresponding to the device type according to the preset mapping table, the smart terminal device may search the device type corresponding to the device name serial number from the mapping table according to the received device name serial number.

After the device types corresponding to the setting information are obtained, the BLUETOOTH devices required for this BLUETOOTH scan operation are obtained by filtering from the scanned BLUETOOTH devices according to the acquired device type.

Step S23: sending a name request to the filtered BLUETOOTH devices and displaying received device names returned for the name request.

After the smart terminal device obtains the filtered BLUETOOTH devices, it sends a name request to the filtered BLUETOOTH devices, obtains the device name returned from each filtered BLUETOOTH device, and displays the returned device names.

Furthermore, in order to filter to obtain more compatible BLUETOOTH devices, before the step of sending the name request to the filtered BLUETOOTH devices, the method further comprises:

determining whether BLUETOOTH signal strength of each filtered BLUETOOTH device is greater than a preset signal threshold and sending a name request for the BLUETOOTH devices whose BLUETOOTH signals are greater than the preset signal threshold.

If the BLUETOOTH signal strength of the BLUETOOTH devices is weak, the BLUETOOTH connection for data transmission cannot be realized normally. Therefore, in this step, in order to achieve better filtering of BLUETOOTH devices, after filtering the unnamed BLUETOOTH devices according to the device type corresponding to the set filter attribute information, there further comprises a step of filtering the filtered BLUETOOTH devices again according to the preset signal threshold, a step of filtering the BLUETOOTH signal strength lower than the preset signal threshold, so that it makes the BLUETOOTH connection established by the filtered BLUETOOTH devices more stable. The preset signal threshold is a threshold value of the corresponding BLUETOOTH signal strength when the BLUETOOTH connection cannot operate normally after the strength of BLUETOOTH signal transmitted by the BLUETOOTH device is lower than a certain BLUETOOTH signal strength value. In one embodiment, the preset signal threshold is −70 dbm, which means that when the strength of the BLUETOOTH signal corresponding to a certain BLUETOOTH device is lower than −70 dbm, the BLUETOOTH communication cannot be successfully completed after the BLUETOOTH connection is established with the BLUETOOTH device. Therefore, during the BLUETOOTH scanning process, the BLUETOOTH devices whose BLUETOOTH signal strength values are greater than or equal to −70 dbm are scanned and read, so that the speed of scanning may be further accelerated. It should be noted that the larger the signal value is, the stronger the signal strength is.

Since this Bluetooth scanning operation corresponds to different devices that need to be established a Bluetooth connection, after the step of filtering the scanned Bluetooth device according to the filter attribute information and displaying the filtered Bluetooth device information, the method further comprise:

clearing the received setting information of the filter attribute information.

As shown in FIG. 2, in one embodiment, the method for scanning BLUETOOTH devices in the present disclosure includes following steps:

receiving a BLUETOOTH scanning instruction and acquiring filter attribute information; wherein the filter attribute information is device attribute information of BLUETOOTH devices to be filtered in this BLUETOOTH scanning operation;

filtering the scanned BLUETOOTH devices according to the filter attribute information and displaying the filtered BLUETOOTH device information.

Figure 3:
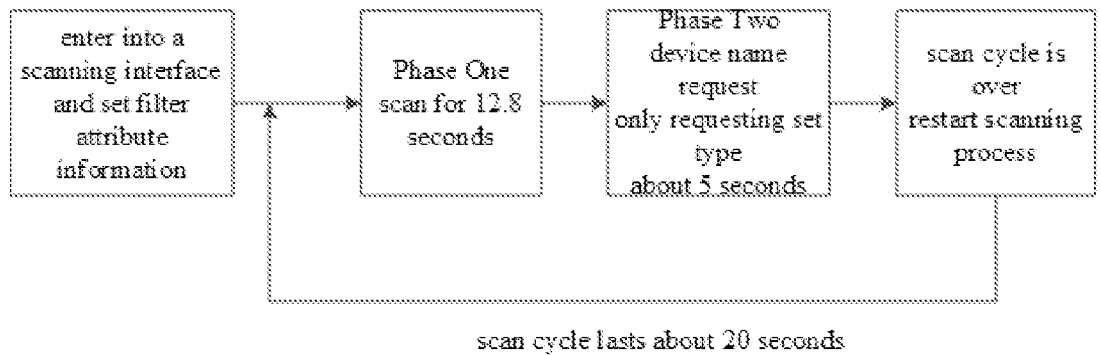
FIG. 3 is a schematic diagram of the steps of the BLUETOOTH scanning control method in an embodiment of the present disclosure.

Referring to FIG. 3, the present disclosure optimizes the scanning process. The optimized process is as follows: the scanning process is divided into two phases. Phase One is a fixed scan time of 12.8 s (BLUETOOTH specification), and in Phase One, the BLUETOOTH devices in the pairing mode are to be scanned around a scanning channel, and the BLUETOOTH devices that have received the scan request will respond to the mobile BLUETOOTH terminal (the response information comprises some of its own information including device type, service, and name). After the scan is enabled, the device types are set, and the device names of the BLUETOOTH devices in the pairing mode are displayed. When entering Phase Two, a name request for the unnamed BLUETOOTH devices is made, and the device names of the BLUETOOTH devices for filtered device type (for example, a speaker, an earphone, a mouse, a keyboard, and so on) are read and displayed, which greatly shortens the scan time in Phase Two, and the entire scanning cycle may be shortened to less than 20 seconds.

In a further implementation of an embodiment, before the step of entering into a scanning interface to scan the surrounding BLUETOOTH devices and displaying the device names of the BLUETOOTH devices in the pairing mode, the method further includes:

defining a property of the device types.

Before starting the scanning process, it is required to customize data format used for the BLUETOOTH device types. Currently, there are two schemes for customizing the data format of the BLUETOOTH device types. One is to be implemented by adding an interface, but the workload is large. Other is to invoke the BLUETOOTH protocol stack software to filter devices by setting property. This method has a small workload and is easy to implement, but a system has a limit on size of property value (maximum 91 bytes), so it is necessary to make a mapping table to minimize character length of value. In one embodiment of the present disclosure, a table is made to map all BLUETOOTH types in an Android framework, and an upper-level application package (APK) only needs to transmit an index, and then use "," to separate, as shown in table shows:

| index | cod | comment |
|---|---|---|
| 1 | 0x0100 | COMPUTER_UNCATEGORIZED |
| 2 | 0x0104 | COMPUTER_DESKTOP |
| 3 | 0x0108 | COMPUTER_SERVER |
| 4 | 0x010C | COMPUTER_LAPTOP |
| 5 | 0x0110 | COMPUTER_HANDHELD_PC_PDA |
| 6 | 0x0114 | COMPUTER_PALM_SIZE_PC_PDA |
| 7 | 0x0200 | PHONE_UNCATEGORIZED |
| 8 | 0x0204 | PHONE_CELLULAR |
| 9 | 0x0208 | PHONE_CORDLESS |
| 10 | 0x020C | PHONE_SMART |
| 11 | 0x0210 | PHONE_MODEM_OR_GATEWAY |
| 12 | 0x0214 | PHONE_ISDN |
| 13 | 0x0400 | AUDIO_VIDEO_UNCATEGORIZED |
| 14 | 0x0404 | AUDIO_VIDEO_WEARABLE_HEADSET |
| 15 | 0x0408 | AUDIO_VIDEO_HANDSFREE |
| 16 | 0x0410 | AUDIO_VIDEO_MICROPHONE |
| 17 | 0x0414 | AUDIO_VIDEO_LOUDSPEAKER |
| 18 | 0x0418 | AUDIO_VIDEO_HEADPHONES |
| 19 | 0x041C | AUDIO_VIDEO_PORTABLE_AUDIO |
| 20 | 0x0420 | AUDIO_VIDEO_CAR_AUDIO |
| 21 | 0x0424 | AUDIO_VIDEO_SET_TOP_BOX |
| 22 | 0x0428 | AUDIO_VIDEO_HIFI_AUDIO |
| 23 | 0x042C | AUDIO_ VIDEO_VCR |
| 24 | 0x0430 | AUDIO_VIDEO_VIDEO_CAMERA |
| 25 | 0x0434 | AUDIO_VIDEO_CAMCORDER |
| 26 | 0x0438 | AUDIO_VIDEO_VIDEO_MONITOR |
| 27 | 0x043C | AUDIO_VIDEO_VIDEO_DISPLAY_AND_LOUDSPEAKER |
| 28 | 0x0440 | AUDIO_VIDEO_VIDEO_CONFERENCING |
| 29 | 0x0448 | AUDIO_ VIDEO_VIDEO_G AMING_TOY |
| 30 | 0x0500 | PERIPHERAL_NON_KEYBOARD_NON_POINTING |
| 31 | 0x0540 | PERIPHERAL_KEYBOARD |
| 32 | 0x0580 | PERIPHERAL_POINTING |
| 33 | 0x05C0 | PERIPHERAL_KEYBOARD_POINTING |
| 34 | 0x0504 | PERIPHERAL_JOYSTICK |
| 35 | 0x0508 | PERIPHERAL_GAMEPAD |
| 36 | 0x050C | PERIPHERAL_REMOTE |
| 37 | 0x0700 | WEARABLE_UNCATEGORIZED |

-continued

| index | cod | comment |
|---|---|---|
| 38 | 0x0704 | WEARABLE_WRIST_WATCH |
| 39 | 0x0708 | WEARABLE_PAGER |
| 40 | 0x070C | WEARABLE_JACKET |
| 41 | 0x0710 | WEARABLE_HELMET |
| 42 | 0x0714 | WEARABLE_GLASSES |
| 43 | 0x0800 | TOY_UNCATEGORIZED |
| 44 | 0x0804 | TOY_ROBOT |
| 45 | 0x0808 | TOY_VEHICLE |
| 46 | 0x080C | TOY_DOLL_ACTION_FIGURE |
| 47 | 0x0810 | TOY_CONTROLLER |
| 48 | 0x0814 | TOY_GAME |
| 49 | 0x0900 | HEALTH_UNCATEGORIZED |
| 50 | 0x0904 | HEALTH_BLOOD_PRESSURE |
| 51 | 0x0908 | HEALTH_THERMOMETER |
| 52 | 0x090C | HEALTH_WEIGHING |
| 53 | 0x0910 | HEALTH_GLUCOSE |
| 54 | 0x0914 | HEALTH_PULSE_OXIMETER |
| 55 | 0x0918 | HEALTH_PULSE_RATE |
| 56 | 0x091C | HEALTH_DATA_DISPLAY |

Combined with the above table, the property name of the BLUETOOTH filtering device types may be customized. For example, it may be defined as: sys.tcl.bt.cod, and then when scanning the setting interface, this property will be set as: setprop sys.tcl.bt.cod"13,14,15,17,18,19,22,31,32,34,35,36", while the BLUETOOTH protocol stack software needs to acquire this attribute to filter a remote name request (RNR). When this attribute is empty or 0, it is to scan all types without filtering. That is to say, when the BLUETOOTH device sends a name request, it is filtered by obtaining the property of the BLUETOOTH device types. In a case that the obtained property of the BLUETOOTH device types is empty or 0, all the BLUETOOTH device types are scanned, that is, according to the conventional scanning process. Phase One is to scan the surrounding BLUETOOTH devices. This process lasts for 12.8 seconds, and then Phase Two is performed, that is, the names of the BLUETOOTH devices scanned in Phase One are read. The process will last about 2-3 minutes.

After defining the mapping table required by the quick scan, when the quick scan operation needs to be enabled, it is necessary to set the device attribute information to be filtered for this scan operation, specifically setting the device type corresponding to this filtering, and to implement a quick scan operation according to the set device type. It is conceivable that, if the quick scan operation provided by this embodiment is not required to be enabled, it is unnecessary to set the filter attribute information to be filtered and obtain the filter attribute information, then the BLUETOOTH scanning operation is completed according to steps in the prior art.

When the fast BLUETOOTH scanning control operation provided by this embodiment is enabled, it has following steps:
  receiving the BLUETOOTH scanning instruction and setting the filter attribute information; wherein the filter attribute information is the device attribute information of the BLUETOOTH devices to be filtered in this BLUETOOTH scanning operation;
  acquiring the filter attribute information, performing a BLUETOOTH scanning operation according to the filter attribute information, and displaying BLUETOOTH device information obtained by means of scanning.

Specifically, the function of scanning device is automatically enabled after entering into a BLUETOOTH interface of a settings menu of the mobile terminal. In the process of starting the scanning process, a property is set to identify the device type to be filtered. After the setting is completed, the scanning process will be started. After starting the scanning process, the BLUETOOTH protocol stack software will obtain and parse the property set by the application before scanning, and then start to send a scan (Inquiry) command to the BLUETOOTH module (BLUETOOTH module chip) to scan the surrounding BLUETOOTH devices. The above process will last for 12.8 seconds, and the BLUETOOTH devices in pairing mode will respond, for example, there is a name in the reply packet (extend inquiry response), it will be displayed on an upper-level user interface (UI). When the BLUETOOTH devices do not display the device names, it will acquire the name through the RNR (remote name request) in Phase Two.

Specifically, in Phase Two of the scanning process, after receiving the RNR response packet of the peer device, the acquired name will be reported to the upper-level UI for display, for example, all BLUETOOTH devices in the BLUETOOTH device queue have completed the RNR, this phase is completed, namely, the scanning process is completed, and the property is required to be cleared at this time. At a same time, Phase Two for the second scan is entered. The second scan is used to prevent the BLUETOOTH devices without names in the first scan process from being displayed. When there are no new devices in the pairing mode during the second scan, then Phase Two does not take any time, which means that names for all BLUETOOTH devices have been obtained.

Figure 4:
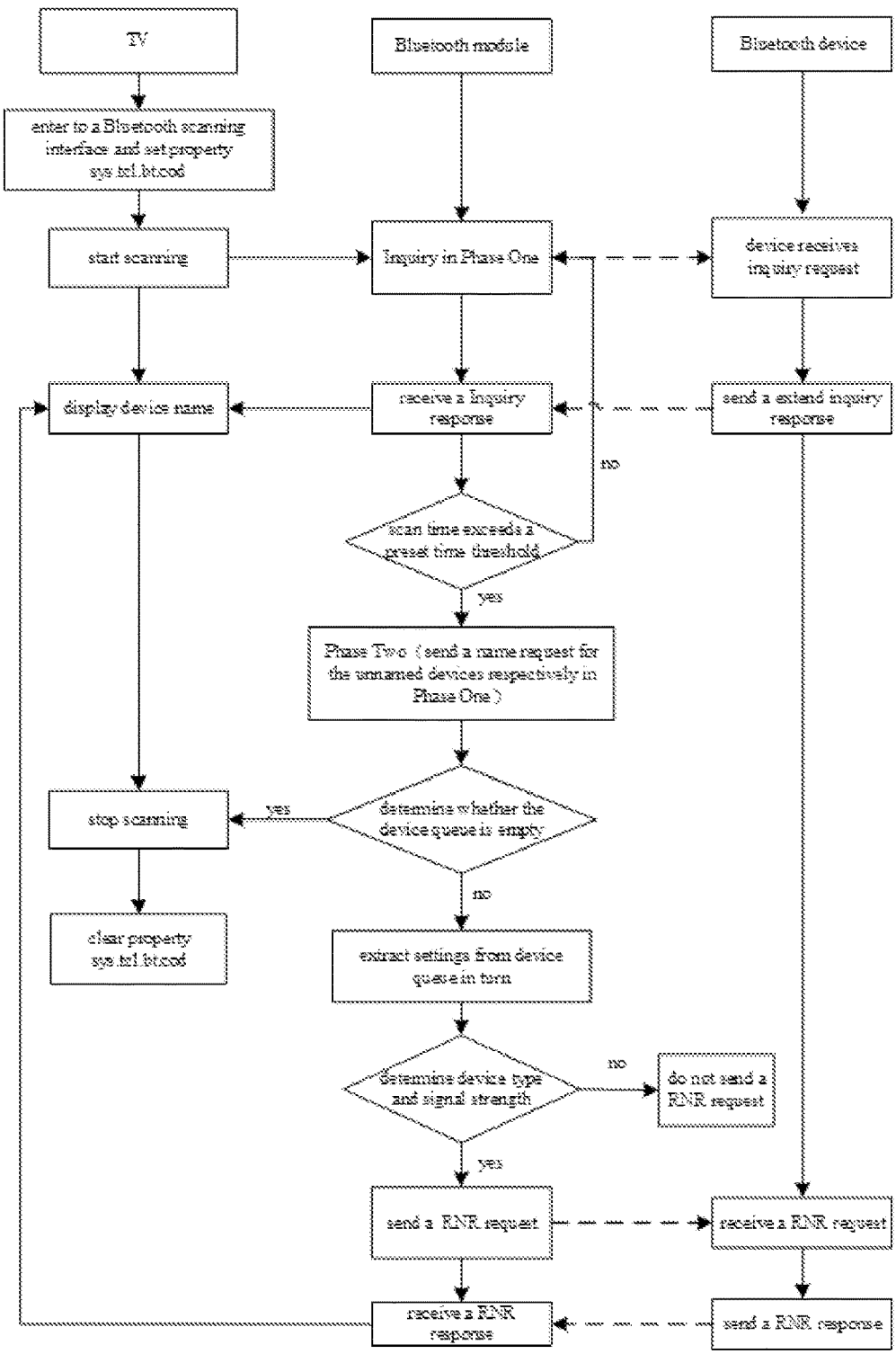
FIG. 4 is a flow chart of steps in a specific application of the BLUETOOTH scanning control method in an embodiment of the present disclosure.

Please refer to FIG. 4. FIG. 4 is a specific application embodiment of the method for scanning BLUETOOTH devices applied to a television.

As shown in FIG. 4, in specific application, the method involves a television terminal, a BLUETOOTH module of the television terminal, and various BLUETOOTH devices. Each BLUETOOTH device may be a mobile phone with a BLUETOOTH module, a laptop computer, or a BLUETOOTH headset, and so on. When the television needs to play audio through the BLUETOOTH speaker, it is necessary to establish a BLUETOOTH connection between BLUETOOTH module of the television and the BLUETOOTH module of the BLUETOOTH speaker.

When the television is switched on, it will start scanning the setting interface and set a system property sys.tcl.bt.cod before scanning to invoke the BLUETOOTH protocol stack software to start scanning. The setting of the system property is to set the filter attribute information, namely, the device types of the BLUETOOTH devices to be filtered and obtained in this BLUETOOTH scanning step. During specific implementation, when the television needs to establish a BLUETOOTH connection with the BLUETOOTH speaker, the system property sys.tcl.bt.cod corresponding to the device type is set as the BLUETOOTH speakers. When the BLUETOOTH scans for 12.8 s, the name request process starts for the device without device name. In this process, the device type of the requested devices will be filtered. When it is not the device type set in the system property, the name request will not be made. After the scan is completed, clear the system property sys.tcl.bt.cod so that other applications may scan for devices of other device types. The scanning process is as follows:

Step 1: After entering into a BLUETOOTH interface of a settings menu of the television, the function of scanning devices is automatically enabled. During this startup, a property is set to identify the type of devices to be filtered, and when the setting is completed, the scan process will start.

Step 2: After the scan is started, the BLUETOOTH protocol stack software will obtain and parse the filter attribute information set by the application before scanning, and then start to send the Inquiry command to the BLUETOOTH module chip to scan the surrounding BLUETOOTH devices. The process will last for 12.8 seconds, and the BLUETOOTH devices in pairing mode will respond. If a name is in the reply packet (extend inquiry response), it will be displayed on the upper-level UI. If the device names of the BLUETOOTH devices sending the response packet are not obtained through analyzing the response packet, the names will be obtained through RNR (remote name request) in Phase Two.

Step 3: After entering Phase Two, a device queue for the BLUETOOTH devices that did not obtain the device names in Phase One is first created, and then a name request is sent respectively to each BLUETOOTH device contained in the device queue. In order to reduce waiting time for sending the name request and receiving the feedback information of the name request, compare and determine whether the device type of each BLUETOOTH device contained in the device queue is the device type in the set filter attribute information before sending the name request. If so, it is determined that the BLUETOOTH devices to be filtered are obtained, and a name request is sent to the BLUETOOTH devices. If not, it is determined that the BLUETOOTH devices to be filtered are not obtained, the name request for the devices will be skipped.

Step 4: After receiving the RNR response packet of the peer device in Phase Two of the request process, the obtained name will be reported to the upper-level UI for display. When all devices in the queue have completed the RNR, the scanning process is completed, namely, this stage is completed. At this time, property need to be cleared. After entering the second scan cycle, if there are no new devices in pairing mode, Phase Two will not take any time because names for all devices have already been acquired.

The present disclosure also provides a mobile terminal, the mobile terminal includes a memory and a processor, the memory stores a computer program, and the processor implements following steps when executing the computer program:

receiving a BLUETOOTH scanning instruction and setting filter attribute information; wherein the filter attribute information is device attribute information of BLUETOOTH devices obtained by means of filtering in the present BLUETOOTH scanning operation;

acquiring the filter attribute information, performing a BLUETOOTH scanning operation according to the filter attribute information, and displaying BLUETOOTH device information obtained by means of scanning.

Specifically, the method for scanning BLUETOOTH devices is described, and details are not described here again.

The present disclosure also provides a computer readable storage medium on which a computer program is stored, and when the computer program is executed, following steps are implemented:

receiving a BLUETOOTH scanning instruction and setting filter attribute information; wherein the filter attribute information is device attribute information of BLUETOOTH devices obtained by means of filtering in the present BLUETOOTH scanning operation;

acquiring the filter attribute information, performing a BLUETOOTH scanning operation according to the filter attribute information, and displaying BLUETOOTH device information obtained by means of scanning.

Specifically, the method for scanning BLUETOOTH devices is described, and details are not described here again.

Those of ordinary skilled in the art can understand that all or part of the processes in the methods of the above embodiments can be implemented by instructing relevant hardware through a computer program, and the computer program may be stored in a non-volatile computer readable storage medium, when the computer program is executed, it may include the processes of the above-mentioned method embodiments. Wherein any reference to memory, storage, database, or other medium used in the various embodiments provided in this application may include non-volatile and/or volatile memory. Nonvolatile memory may include read only memory (ROM), programmable ROM (PROM), electrically programmable ROM (EPROM), electrically erasable programmable ROM (EEPROM), or flash memory. Volatile memory may include random access memory (RAM) or external cache memory. By way of illustration but not limitation, RAM is available in various forms such as static RAM (SRAM), dynamic RAM (DRAM), synchronous DRAM (SDRAM), double data rate SDRAM (DDRSDRAM), enhanced SDRAM (ESDRAM), synchronous link (Synchlink) DRAM (SLDRAM), memory bus (Rambus) direct RAM (RDRAM), direct memory bus dynamic RAM (DRDRAM), and memory bus dynamic RAM (RDRAM) and so on.

In summary, the BLUETOOTH scanning control method, mobile terminal, and storage medium provided by the present disclosure set filter attribute information through receiving a BLUETOOTH scanning instruction; wherein the filter attribute information is device attribute information of BLUETOOTH devices obtained by means of filtering in the present BLUETOOTH scanning operation. A BLUETOOTH scanning operation is performed according to the filter attribute information and BLUETOOTH device information obtained by means of scanning for display is displayed. In this embodiment, when the BLUETOOTH scanning is performed, the filter attribute information is set before the BLUETOOTH scanning is started, and the filtered BLUETOOTH devices are displayed according to the set filter attribute information during the BLUETOOTH scanning, therefore reducing a scanning period, and achieving the aim of fast scanning.

It should be understood that the application of the present disclosure is not limited to the above examples, and those of ordinary skill in the art can make improvements or transformations according to the above descriptions, and all such improvements and transformations should fall within the protection scope of the appended claims of the present disclosure.

What is claimed is:

1. A BLUETOOTH scanning control method, wherein the method comprises:
   receiving a BLUETOOTH scanning instruction, setting filter attribute information based on user input or pre-configured data; wherein the filter attribute information is device attribute information of BLUETOOTH devices obtained by means of filtering in a present BLUETOOTH scanning operation;
   acquiring the filter attribute information from a system property, a memory, or a configuration module, performing a BLUETOOTH scanning operation according to the filter attribute information, and displaying BLUETOOTH device information obtained by means of scanning;
   wherein the device attribute information is device types of the BLUETOOTH devices; the step of setting the filter attribute information comprises:
   receiving setting information of the filter attribute information and using the device types of one or more BLUETOOTH devices to be filtered contained in the setting information as the filter attribute information;
   wherein the step of performing a BLUETOOTH scanning operation according to the filter attribute information and displaying BLUETOOTH device information obtained by means of scanning comprises:
   filtering out unnamed BLUETOOTH devices whose device names are not obtained from the scanned BLUETOOTH devices;
   filtering out the BLUETOOTH devices whose device types are same as the device types contained in the setting information in the unnamed BLUETOOTH devices to obtain the filtered BLUETOOTH devices;
   sending a name request to the filtered BLUETOOTH devices, receiving a device name returned from the filtered BLUETOOTH devices, and displaying the device names of the BLUETOOTH devices received from the scanning process;
   wherein the step of filtering the unnamed BLUETOOTH devices whose device names are not obtained from the scanned BLUETOOTH devices comprises:
   sending a BLUETOOTH scan request in response to the BLUETOOTH scanning instruction;
   receiving response information returned from each BLUETOOTH device for the BLUETOOTH scan request;
   determining whether time for sending the BLUETOOTH scan request exceeds a preset time threshold;
   if exceeded, filtering the unnamed BLUETOOTH devices according to whether the response information contains a device name.

2. The BLUETOOTH scanning control method as claimed in claim 1, wherein the step of filtering the BLUETOOTH devices whose device types are same as the device types contained in the setting information in the unnamed BLUETOOTH devices comprises:
   creating a device queue consisting of each unnamed BLUETOOTH device obtained by means of filtering;
   determining whether the device queue is empty, if empty, stop the current BLUETOOTH scanning operation.

3. The BLUETOOTH scanning control method as claimed in claim 1, wherein the step of filtering the BLUETOOTH devices whose device types are same as the device types contained in the setting information in the unnamed BLUETOOTH devices comprises:
   creating a device queue consisting of each unnamed BLUETOOTH device obtained by means of filtering;
   determining whether the device queue is empty; if not empty, extract each unnamed BLUETOOTH device from the device queue in turn, and compare whether the device type is same as the device types contained in the setting information, respectively.

4. The BLUETOOTH scanning control method as claimed in claim 3, wherein before the step of comparing whether the device type is the same as the device types contained in the setting information respectively, the method further comprises:
   creating a mapping table, the mapping table is a table of correspondence between setting name serial numbers and device types of the BLUETOOTH devices.

5. The BLUETOOTH scanning control method as claimed in claim 3, wherein the step of comparing whether the device type is same as the device types contained in the setting information respectively comprises:
   parsing the received setting information of the filter attribute information to parse out the setting name serial number contained in the device information;
   searching the device type of the BLUETOOTH devices to be filtered from the preset mapping table according to the setting name serial number, wherein the mapping table is a correspondence table between the setting name serial numbers and the device types of the BLUETOOTH devices;
   comparing the device type of the unnamed BLUETOOTH devices with each device type searched one by one and using the unnamed BLUETOOTH devices with same comparison result as the filtered BLUETOOTH devices.

6. The BLUETOOTH scanning control method as claimed in claim 1, wherein before the step of sending the name request to the filtered BLUETOOTH devices, the method further comprises:
   determining whether the BLUETOOTH signal strength of each filtered BLUETOOTH device is greater than a preset signal threshold and sending a name request for the BLUETOOTH devices whose BLUETOOTH signals are greater than the preset signal threshold.

7. The BLUETOOTH scanning control method as claimed in claim 1, wherein after the step of performing a BLUETOOTH scanning operation according to the filter attribute information and displaying BLUETOOTH device information obtained by means of scanning, the method further comprises:
   clearing the received setting information of the filter attribute information.

8. The BLUETOOTH scan control method as claimed in claim 1, wherein a process of a BLUETOOTH scan request includes multiple BLUETOOTH scan cycles, each BLUETOOTH scan cycle comprises two phases, Phase One is to scan for paired BLUETOOTH devices around itself and to receive the response information returned from the BLUETOOTH devices that have accepted the scan request; the Phase Two is time to read the unnamed BLUETOOTH devices in the response scanned in Phase One.

9. The BLUETOOTH scanning control method as claimed in claim 8, wherein the duration of Phase One is a fixed scan time, when the scan time of Phase One is timed out, it is determined whether all received response information contain the device names of the BLUETOOTH devices, and if so, skip the BLUETOOTH devices.

10. The BLUETOOTH scanning control method as claimed in claim 1, wherein before the step of acquiring the filter attribute information and performing the BLUETOOTH scanning operation according to the filter attribute information, the method further includes: defining a property of the device types of the BLUETOOTH devices.

11. A mobile terminal, comprising a memory and a processor, the memory stores a computer program, wherein the processor implements the steps of the method of claim 1 when the program is executed.

12. A non-transitory computer readable storage medium having a computer program stored thereon, wherein the program, when executed, implements the steps of the method of claim 1.

* * * * *